(12) United States Patent
Humphries et al.

(10) Patent No.: US 10,876,988 B2
(45) Date of Patent: Dec. 29, 2020

(54) WEAR INDICATING COMPONENT AND METHOD OF MONITORING WEAR

(71) Applicant: Weir Minerals Australia Ltd, Artarmon (AU)

(72) Inventors: Edward Humphries, Artarmon (AU); Michael Hambe, Artarmon (AU)

(73) Assignee: Weir Minerals Australia Ltd.

( * ) Notice: Subject to any disclaimer, the term of this patent is extended or adjusted under 35 U.S.C. 154(b) by 80 days.

(21) Appl. No.: 16/099,382

(22) PCT Filed: May 13, 2017

(86) PCT No.: PCT/AU2017/050441
§ 371 (c)(1),
(2) Date: Nov. 6, 2018

(87) PCT Pub. No.: WO2017/193178
PCT Pub. Date: Nov. 16, 2017

(65) Prior Publication Data
US 2019/0204256 A1    Jul. 4, 2019

(30) Foreign Application Priority Data

May 13, 2016 (AU) ................................ 2016901782
Aug. 8, 2016 (AU) ................................ 2016903110

(51) Int. Cl.
*G01N 27/24* (2006.01)
*F16L 57/06* (2006.01)
*F16L 11/12* (2006.01)
*G01N 27/20* (2006.01)

(52) U.S. Cl.
CPC .............. *G01N 27/24* (2013.01); *F16L 11/12* (2013.01); *F16L 57/06* (2013.01); *G01N 27/20* (2013.01)

(58) Field of Classification Search
CPC ............ G01R 33/3621; G01R 33/5616; G01R 33/3642; G01R 33/3692
USPC ................................. 324/300, 318, 322, 658
See application file for complete search history.

(56) References Cited

U.S. PATENT DOCUMENTS

| | | | | |
|---|---|---|---|---|
| 6,873,173 | B2 * | 3/2005 | Kollmer | G01R 31/275 324/750.16 |
| 6,937,047 | B2 * | 8/2005 | Tran | G01R 31/2884 324/750.3 |
| 7,492,180 | B2 * | 2/2009 | Forstner | G01S 7/032 324/750.3 |
| 10,418,148 | B2 * | 9/2019 | Chang | H05K 1/0373 |
| 2002/0001947 | A1 * | 1/2002 | Cathey | H01L 21/76882 438/677 |
| 2006/0217906 | A1 * | 9/2006 | Barbara | G01R 1/36 702/60 |
| 2009/0133745 | A1 * | 5/2009 | Sterzel | C30B 23/02 136/256 |
| 2010/0281854 | A1 * | 11/2010 | Huang | F02D 41/1495 60/276 |
| 2012/0182023 | A1 * | 7/2012 | Zhang | G01M 11/3109 324/501 |

(Continued)

*Primary Examiner* — Giovanni Astacio-Oquendo
(74) *Attorney, Agent, or Firm* — Morriss O'Bryant Compagni Cannon PLLC.

(57) ABSTRACT

Component for use in mineral processing are described including a substantially electrically conductive layer of elastomeric material; and two or more measurement points in the form of electrical connections are provided at different points of the electrically conductive layer.

16 Claims, 8 Drawing Sheets

(56) References Cited

U.S. PATENT DOCUMENTS

| | | | |
|---|---|---|---|
| 2013/0061971 A1 | 3/2013 | Chamerland | |
| 2013/0126400 A1* | 5/2013 | Vladimirov | B07C 5/346 209/576 |
| 2015/0028021 A1* | 1/2015 | Beckel | B23K 1/005 219/615 |
| 2015/0309099 A1 | 10/2015 | Zhu et al. | |
| 2016/0038979 A1* | 2/2016 | Kazakov | B07C 5/346 209/589 |

* cited by examiner

WEAR INDICATING COMPONENT AND METHOD OF MONITORING WEAR

TECHNICAL FIELD

This disclosure relates in general to components for mineral processing equipment and in particular to wear indicating components and methods of monitoring wear.

BACKGROUND OF THE DISCLOSURE

Various items of mineral processing equipment include wear resistant components which must be replaced from time to time. Examples include wear resistant pump side liners, cyclone liners, pump throatbush liners, valve sleeves, truck bed liners and hoses. A major problem with existing pump and cyclone liners is that their wear life can vary by as much as 30% between campaigns in the same duty. These liners are generally not accessible when in service. They can generally only be accessed for inspection or replacement after the piece of equipment they are associated with is shut down for maintenance. The result of this is that the remaining life of a component can only be guessed at.

As part of an ongoing maintenance plan either a conservative estimate of the service life of a component is made which usually results in the component being replaced when it could have remained in service for a longer period of time. Alternatively, the equipment is operated until the component fails, which results in an unplanned shutdown to replace the component. There remains a need for an improved ability to ascertain the remaining life of a wear component.

SUMMARY

In a first aspect, there is provided a component for use in mineral processing including a substantially electrically conductive layer of elastomeric material; and two or more measurement points in the form of electrical connections are provided at different points of the electrically conductive layer.

Each measurement point may include a pair of electrical connections.

The component may further include a first substantially electrically insulating layer.

The first substantially electrically insulating layer may be formed from an elastomeric material.

The first substantially electrically insulating layer may be formed from a ceramic material.

The component may further include a second substantially electrically insulating layer, the substantially electrically conductive layer being disposed between the substantially electrically insulating layer of elastomeric material and the second substantially electrically insulating layer.

The second substantially electrically insulating layer may be in the form of a coating.

In a second aspect there is provided a method of monitoring wear of a component according to the first aspect the method including the step of: measuring changes in the electrical characteristics of the substantially electrically conductive layer by way of the measurement points.

The electrical characteristics may include voltage.

The electrical characteristics may include current.

The electrical characteristics may include capacitance.

The electrical characteristics may include impedance.

The component may be installed in an item of mineral processing equipment and the medium being processed by the equipment forms part of an electrical circuit.

The medium may include slurry.

Other aspects, features, and advantages will become apparent from the following detailed description when taken in conjunction with the accompanying drawings, which are a part of this disclosure and which illustrate, by way of examples, principles of the inventions disclosed.

DESCRIPTION OF THE FIGURES

The accompanying drawings facilitate an understanding of the various embodiments.

DETAILED DESCRIPTION

Figure 1:
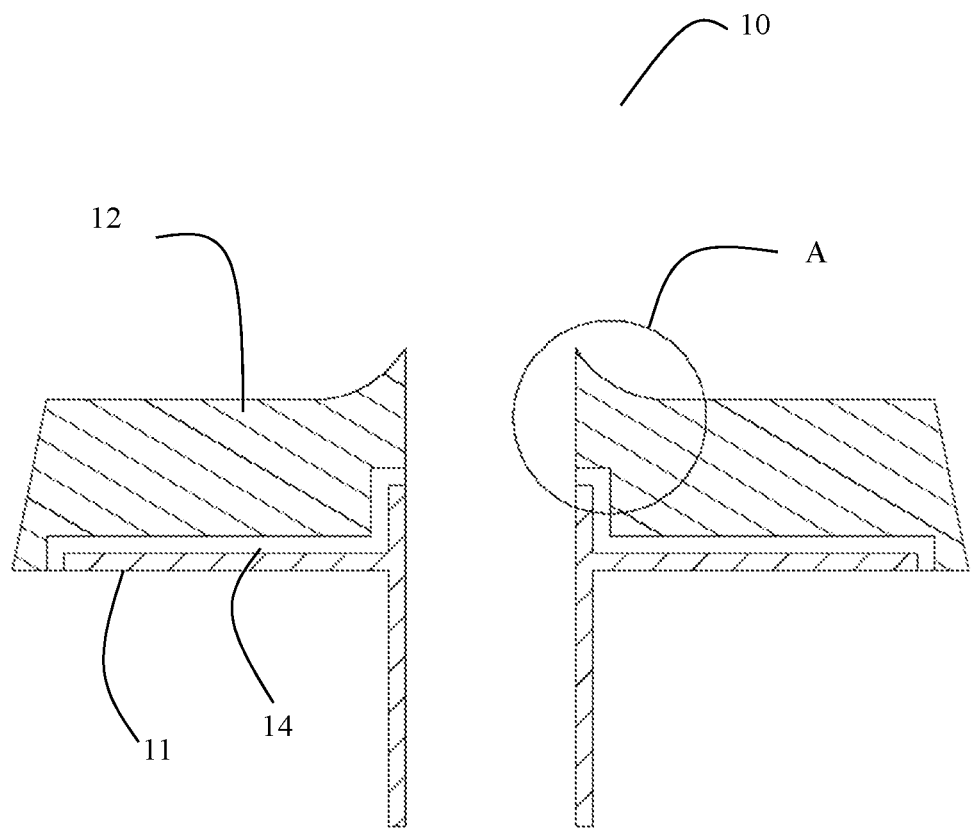
FIG. 1 shows a cross sectional view of a throatbush in accordance with this disclosure.
Figure 2:
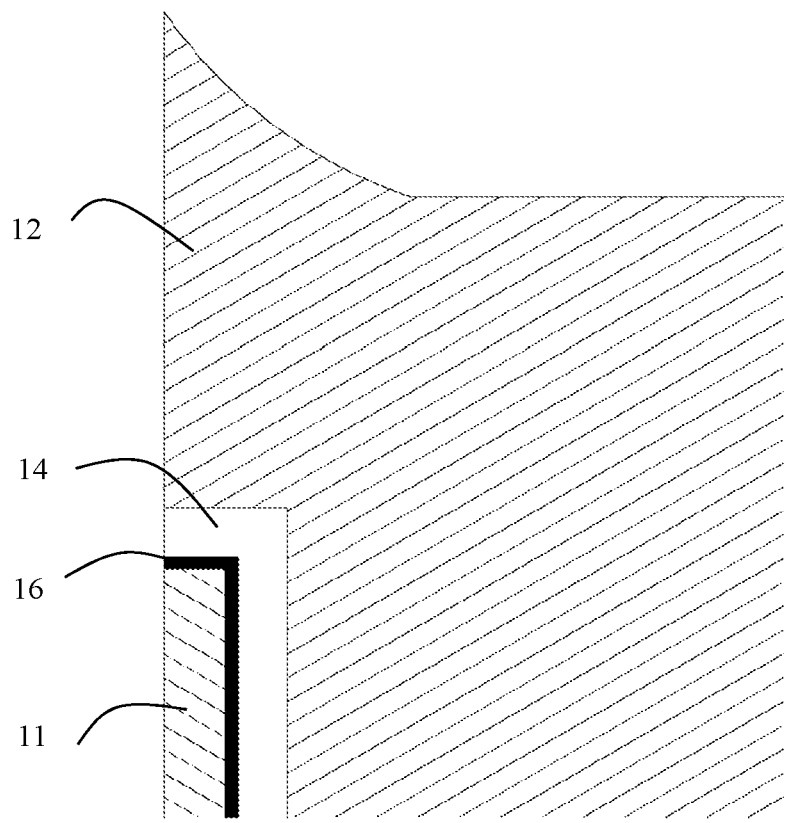
FIG. 2 is an enlarged view of Detail A of FIG. 1.

Referring to FIGS. 1 and 2, a component in the form of throatbush 10 is shown for use in a slurry pump. The throatbush is part of the suction-side liner of the pump and protects the pump outer casing from abrasive wear which would otherwise be inflicted on the pump outer casing by the slurry being pumped. Over time the throatbush wears away and becomes due for replacement.

Throatbush 10 includes a wear indicating liner comprised of a first substantially electrically insulating layer in the form of non-conductive rubber layer 12 which is bonded to a substantially electrically conductive layer in the form of conductive rubber layer 14. The conductive layer 14 can be created by means such as, but not limited to, doping a traditional elastomer formulation with a conductive additive such as Ketjen Black EC660 from AzkoNobel. Other conductive additives may also be used, such as conductive metal powers and fibres. In the example of Ketjen Black EC660, a loading of 10 parts per hundred rubber or more was found to be ideal to effect conductivity in the rubber compound.

The throatbush 10 further includes a second substantially electrically insulating layer in the form of a layer of isolating coating 16 (shown in FIG. 2) such as a non-conductive layer of paint, an insulating layer of fluorelastomer rubber, or any other insulating material that may be suitable.

The throatbush also includes a metal reinforcing core 11.

The non-conductive rubber layer 12 is formed from a standard, wear resistant, substantially non-conductive rubber. The two layers 12, 14 are bonded together either after vulcanisation as a laminate or during vulcanisation as a two compound rubber composite. After bonding, the exposed outer layer of conductive rubber is coated with the electrically isolating coating 16, or the insulating coating is applied to the metal core 11 that the rubber is intended to protect.

When the throatbush 10 is in service in a pump a voltage or current is passed through the conductive rubber layer 14 by way of electrical terminals. When the rubber layer 12 wears and exposes the conductive layer 14 to the slurry, the voltage drop or current leakage observed can be used to infer the remaining wear life of the rubber liner and provide a trigger to plan replacement of the throatbush 10 before unplanned failure occurs.

Figure 3:
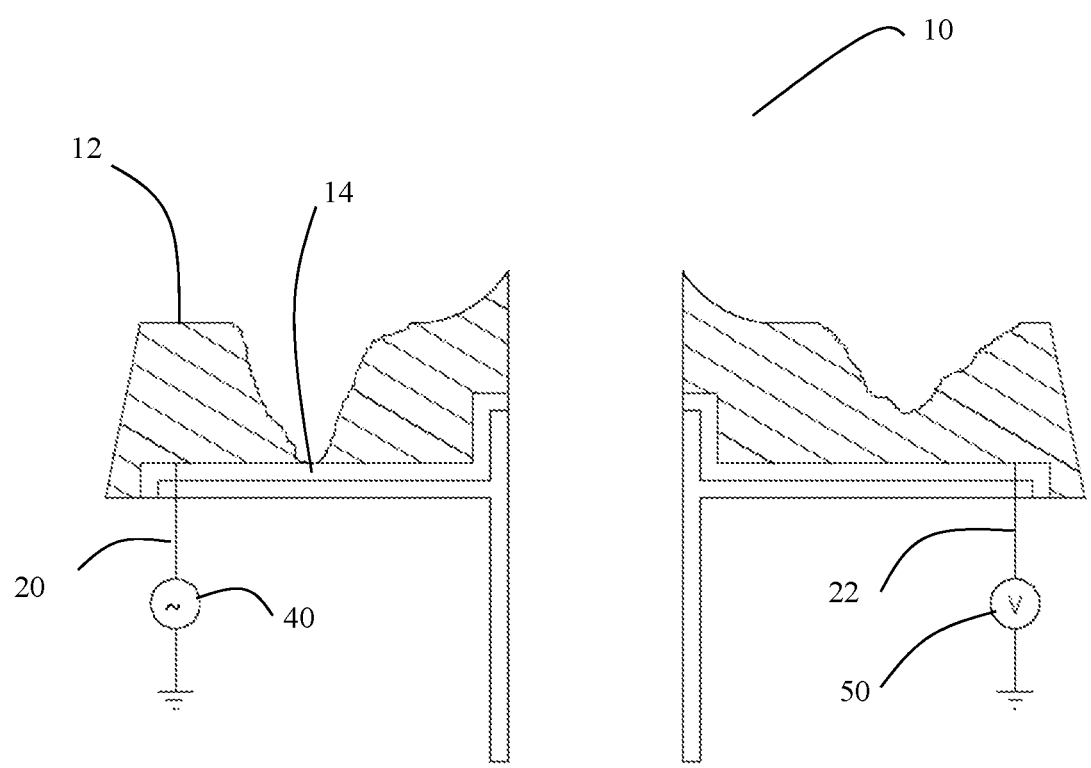
FIG. 3 shows an alternative electrical arrangement utilising the throatbush of FIG. 1 where the media is independent in the measurement.

Referring to FIG. 3, throatbush 10 is shown in cross-section in use and following a period of use in a pump. Non-conductive rubber layer 12 shows some wear as a result of abrasive action of slurry 30 which has exposed an area of the conductive layer 14. Conductive wire terminals 20, 22 are attached to the conductive layer 14 at opposite sides of the throatbush 10. A signal source 40 is used to provide excitation, with a measuring device 50 completing the circuit. When the slurry in the pump comes into contact with the conductive layer 14 this is detected by the measuring device as a change in capacitance in the circuit. The degree of change in capacitance is proportional to the extent of the area of the conductive layer 14 which has been exposed and thus provides an indication of the amount of wear on the liner 100.

In this embodiment the conductive rubber layer 14 constitutes the outer 20% of the overall thickness of the liner 10. The non-conductive rubber layer 12 constitutes the inner 80% of the thickness of the liner 10. These ratios can vary depending upon the wear rate of the inner insulating layer and the amount of warning required.

Figure 4:
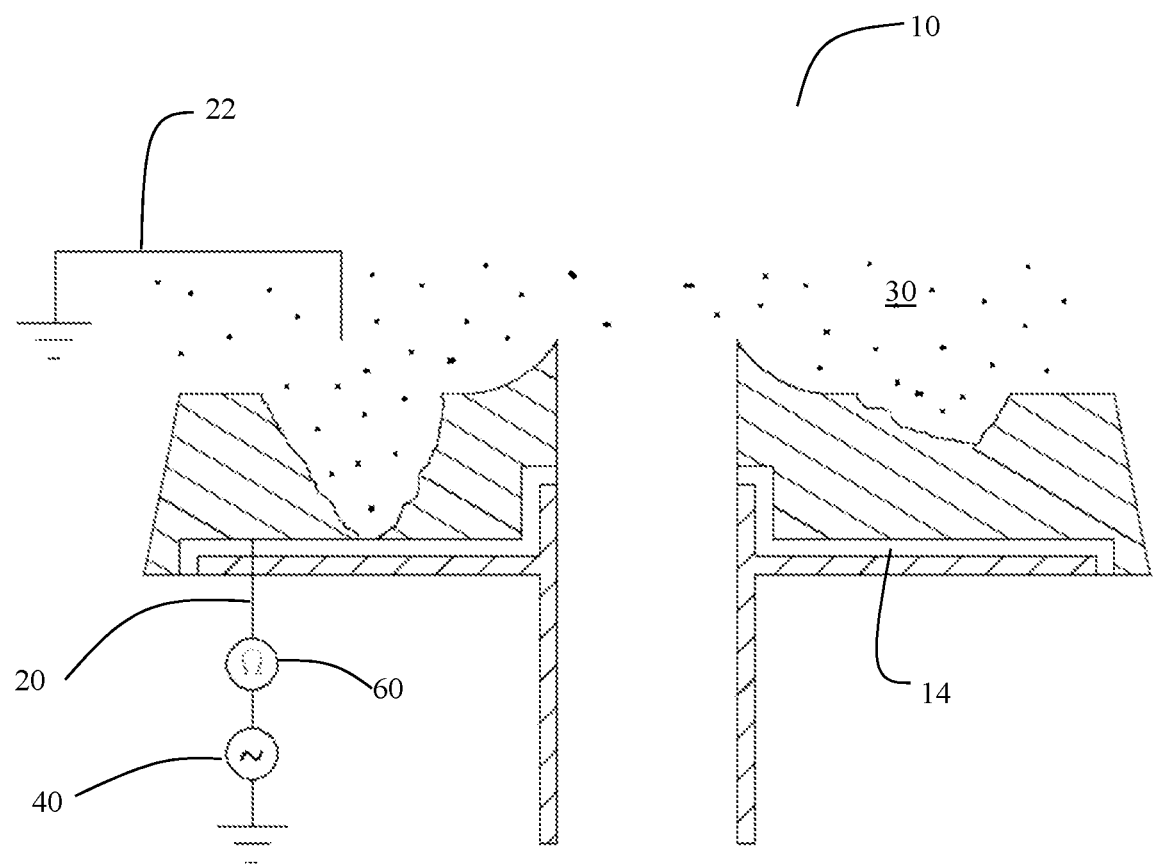
FIG. 4 shows a further alternative electrical arrangement utilising the throatbush of FIG. 1 where the media is an active component of the measurement.

Referring to FIG. 4, electrical contact 22 is embodied by the slurry itself, which completes the electrical circuit upon contact with the conductive indicator 14. An indicator light 60 in this embodiment is located in between the signal source 40 and the connection point 20 illuminates when the slurry 30 completes the electrical circuit by coming into contact with electrically conductive layer 14.

Figure 5:
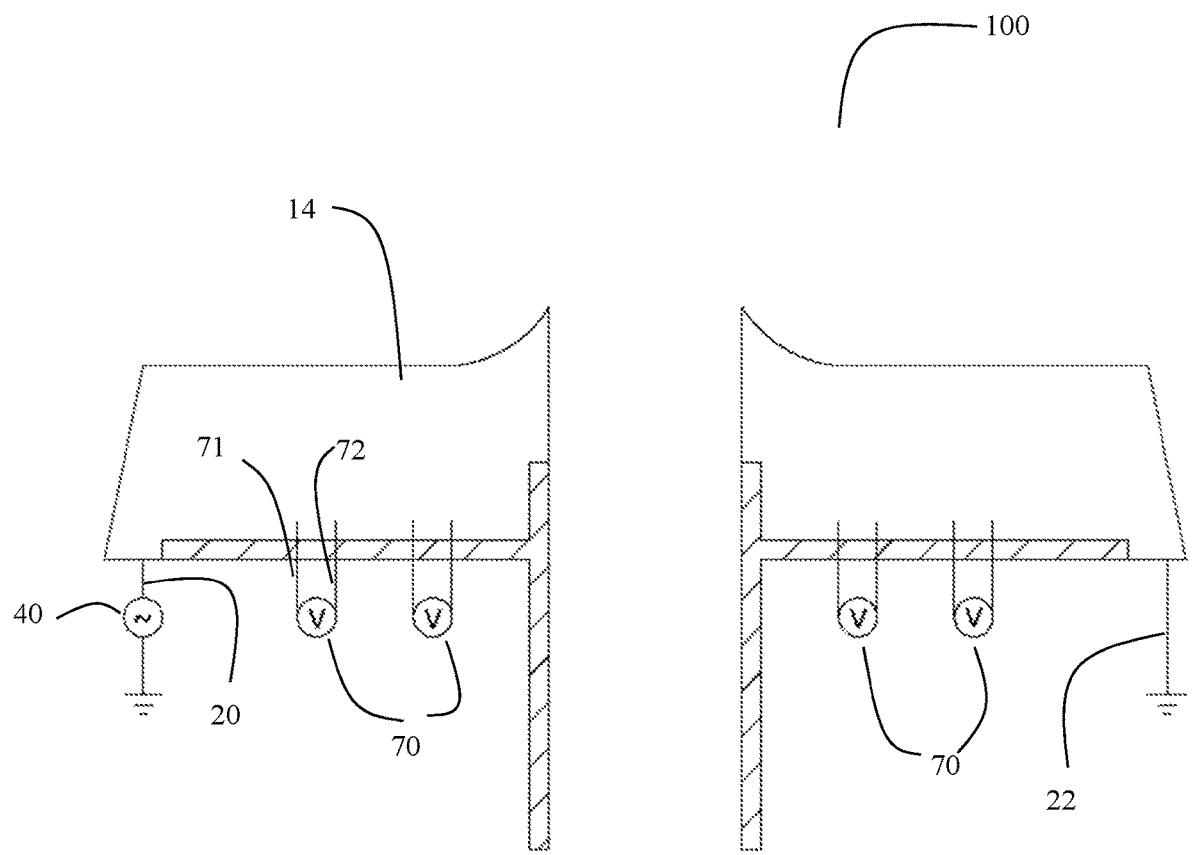
FIG. 5 shows an alternative embodiment of a throatbush.
Figure 6:
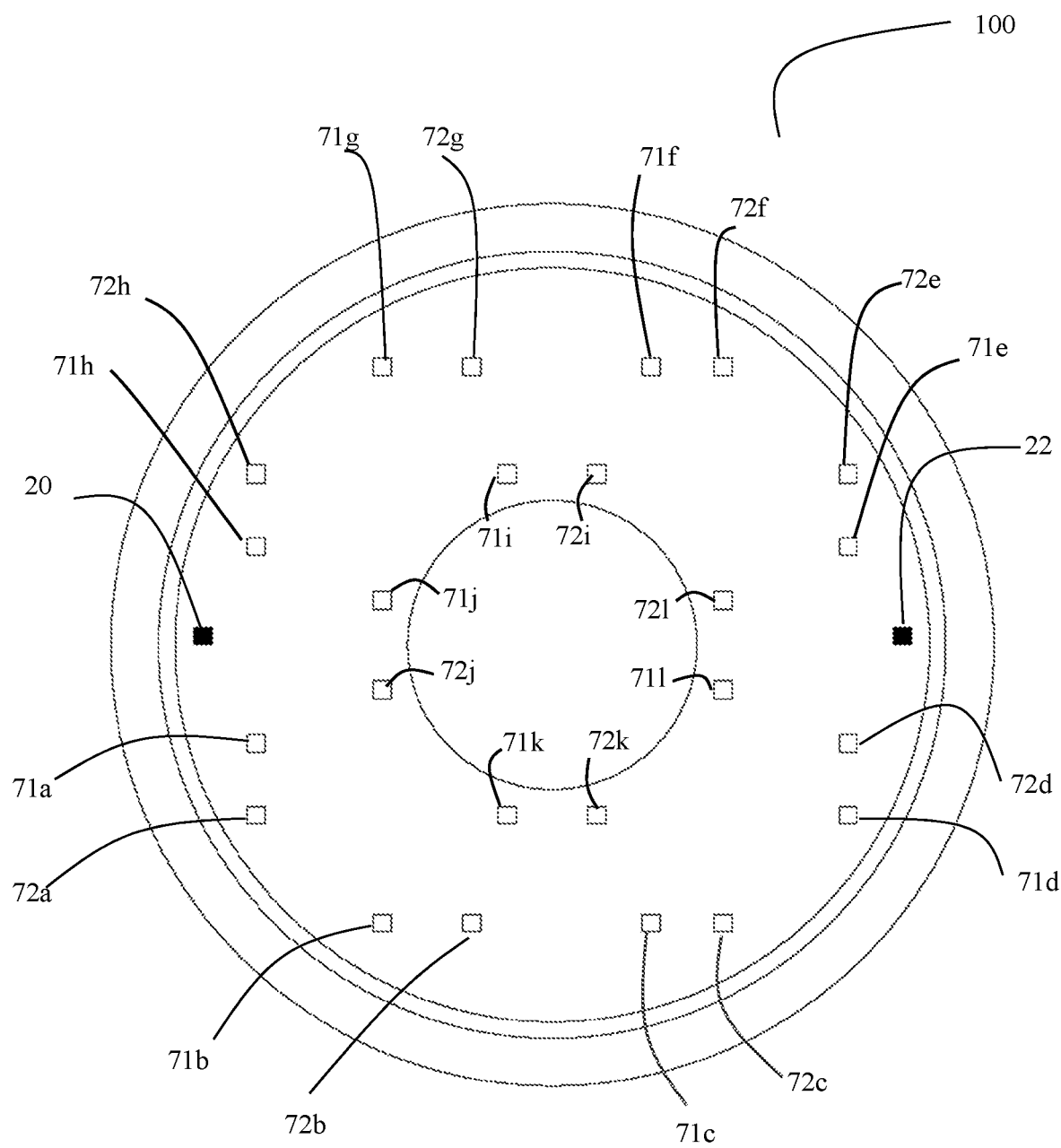
FIG. 6 is a rear view of the throatbush of FIG. 5.

Referring to FIGS. 5 and 6, in this embodiment the conductive indicator layer 14 occupies the complete thickness of the liner of the throatbush 100. A signal and return path are applied to the throatbush via terminals 20 and 22 as in FIG. 3. Monitoring of the wear of the throatbush liner is achieved via multiple measurement points 70 each of which include a pair of electrical connections 71, 72. As best seen in FIG. 6, a total of 12 measurement points are provided in the form of pairs of electrical connections 71a, 72a through 711, 721 which are distributed about the throatbush and are electrically connected at different points of the electrically conductive layer. The electrical connections 71, 72 are each provided in the form of an electrical feedthrough (much like a sparkplug) that insulates the centre conductor from the metal reinforcing 11. The conductive layer 14 is then moulded around the exposed centre conductors.

The measurement points 70 enable measurement of electrical characteristics of the elastomeric material 14 at different locations in the layer. In use a current is fed through the elastomeric material 14 by way of electrical connections 20, 22. The voltage across each pair of connections 71, 72 is measured.

Upon commissioning of the throatbush 100 a map of the voltage drops across the pairs of connections 71a, 72a through 711, 721 is recorded which characterizes the conductivity of the elastomeric layer 14. After a period of use, as the elastomeric material 14 is lost to wear, changes in the voltage map indicate the location and severity of wear. The voltage drops recorded at each measurement point are compared with one another and with the original readings taken at the time of commissioning the throatbush to determine both the location and severity of wear. A measurement point 70 does not need to be directly under a wear event for detection.

The technique of providing multiple measurement points as shown in FIGS. 5 and 6 can be applied to other embodiments described herein.

A circuit can be created by any of the means illustrated in FIG. 3, 4, 5 or 6. During operation this voltage/current can be periodically pulsed at regular intervals to provide indication thereby saving on power requirements.

Figure 7:
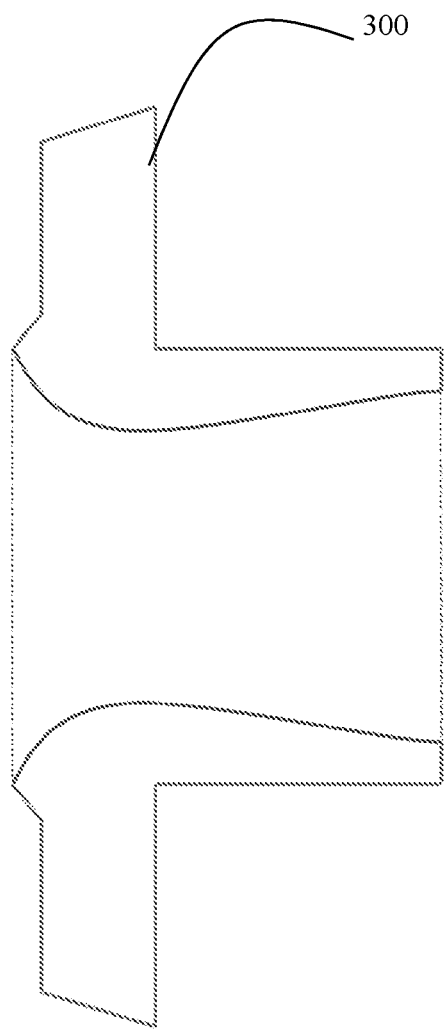
FIG. 7 shows a cross sectional view of a further alternative embodiment of a throatbush.
Figure 8:
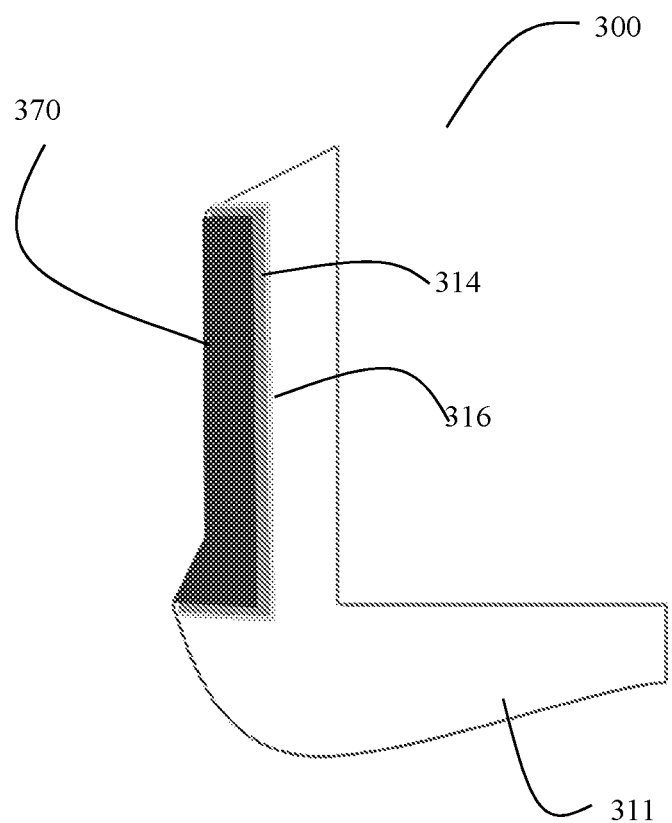
FIG. 8 is a detailed view of the upper region of the cross-sectional view of FIG. 7.

Referring to FIGS. 7 and 8, an alternative embodiment of throatbush 300 is shown. This embodiment differs from that shown in FIGS. 1 and 2 in that the throatbush is ceramic lined.

Once again a conducive rubber layer 314 acts as the indicator, which is bonded to the metal reinforcing 311 via an insulating layer 316 (such as paint). The electrically insulating ceramic insert 370 is then bonded to the conductive rubber layer 314 with appropriate adhesive.

The electrically conductive indicator layer 314 is monitored by external circuitry in accordance with FIGS. 5 and 6.

Although the invention has been described above in relation to various embodiments of throatbush, the invention has application to other types of mineral processing components such as cyclone liners, valve sleeves, hoses and truck bed linings.

In this specification a material is considered to be conductive if it has a resistivity of less than $1 \times 10^4$ ohm.meter.

It can be seen that embodiments according to the disclosure allow the remaining service life of a component to be assessed. The location and severity of wear can be accurately determined during normal operation of equipment thus enabling appropriate scheduling of maintenance work.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A component for use in mineral processing including:
   an electrically conductive layer of elastomeric material; and
   two or more measurement points in the form of electrical connections that are provided at different points of the electrically conductive layer.

2. The component according to claim 1 wherein each measurement point includes a pair of electrical connections.

3. The component according to claim 1 further including a first electrically insulating layer.

4. The component according to claim 3 wherein the first electrically insulating layer is formed from an elastomeric material.

5. The component according to claim 3 wherein the first electrically insulating layer is formed from a ceramic material.

6. The component according to claim 3, further including a second electrically insulating layer, the electrically conductive layer being disposed between the first electrically insulating layer and the second electrically insulating layer.

7. The component according to claim 6 wherein the second electrically insulating layer is in the form of a coating.

8. A method of monitoring wear of a component having an electrically conductive layer of elastomeric material and two or more measurement points in the form of electrical connections that are provided at different points on the electrically conductive layer, including the steps of:
   measuring changes in the electrical characteristics of the electrically conductive layer by way of the measurement points.

9. The method according to claim 8 wherein the electrical characteristics include voltage.

10. The method according to claim 8 wherein the electrical characteristics include current.

11. The method according to claim 8 wherein the electrical characteristics include capacitance.

12. The method according to claim 8 wherein the electrical characteristics include impedance.

13. The method according to claim 8 wherein the component is installed in an item of mineral processing equipment and the medium being processed by the equipment forms part of an electrical circuit.

14. The method according to claim 13 wherein the medium includes slurry.

15. A component for use in mineral processing including:
   an electrically conductive layer of elastomeric material;
   two or more measurement points in the form of electrical connections that are provided at different points of the electrically conductive layer;
   a first electrically insulating layer; and
   a second electrically insulating layer, the electrically conductive layer being disposed between the first electrically insulating layer and the second electrically insulating layer.

16. The component according to claim 15 wherein the second electrically insulating layer is in the form of a coating.

* * * * *